US007349348B1

(12) United States Patent
Johnson et al.

(10) Patent No.: US 7,349,348 B1
(45) Date of Patent: Mar. 25, 2008

(54) METHOD AND APPARATUS FOR DETERMINING A NETWORK TOPOLOGY IN THE PRESENCE OF NETWORK ADDRESS TRANSLATION

(75) Inventors: Kirk Johnson, Boulder, CO (US); James O'Toole, Somerville, MA (US); M. Frans Kaashoek, Lexington, MA (US); John Jannotti, Cambridge, MA (US)

(73) Assignee: CISCO Technologies, Inc., San Jose, CA (US)

( * ) Notice: Subject to any disclaimer, the term of this patent is extended or adjusted under 35 U.S.C. 154(b) by 1111 days.

(21) Appl. No.: 09/824,553

(22) Filed: Apr. 2, 2001

Related U.S. Application Data

(63) Continuation of application No. 09/766,874, filed on Jan. 19, 2001, now abandoned.

(60) Provisional application No. 60/178,062, filed on Jan. 24, 2000.

(51) Int. Cl.
G06F 15/16 (2006.01)
H04L 12/56 (2006.01)

(52) U.S. Cl. .................. 370/254; 370/392; 709/203; 711/202; 711/210

(58) Field of Classification Search ................ 370/254, 370/392; 711/202
See application file for complete search history.

(56) References Cited

U.S. PATENT DOCUMENTS 5,870,562 A 2/1999 Butman et al.

(Continued)

FOREIGN PATENT DOCUMENTS

WO WO 99/40514 8/1999

OTHER PUBLICATIONS

Amir, Yair et al., "Seamlessly selecting the best copy from Internet-wide replicated web servers" *The 12th International Symposium on Distributed Computing*, (DISC'98), Sep. 22-23, 1998.

(Continued)

*Primary Examiner*—Edan Orgad
*Assistant Examiner*—Jay P. Patel
(74) *Attorney, Agent, or Firm*—Hamilton, Brook, Smith, & Reynolds, PC

(57) ABSTRACT

The present invention may be used for determining a topology of a network in the presence of network address translation. From an active client behind a translating device, communications are initiated that effect the network address translation. The communications are monitored beyond the translating device to infer partitioning of servers into equivalence sets relative to the network topology induced by the network address translation. Active clients behind the translating device may include a respective actual sending address in a message sent to a server beyond the translating device. The server beyond the translating device distinguishes between communications affected by and not affected by network address translation, which may include comparing an apparent source address of a message against an actual address provided in the message by the active client behind the translation device. The external server may also distinguish between active and passive client messages. The server server may cause a message to a passive client to be redirected to an active client; the active client, in turn, communicates to the external server. The external server stores addresses of devices in translated address sets, which may be maintained in a database and managed in a database manager.

22 Claims, 8 Drawing Sheets

U.S. PATENT DOCUMENTS

| | | | |
|---|---|---|---|
| 6,035,055 | A | 3/2000 | Wang et al. |
| 6,041,041 | A | 3/2000 | Ramanathan et al. |
| 6,046,988 | A * | 4/2000 | Schenkel et al. ............ 370/254 |
| 6,052,718 | A | 4/2000 | Gifford ........................ 809/219 |
| 6,078,960 | A | 6/2000 | Ballard |
| 6,081,840 | A | 6/2000 | Zhao |
| 6,092,178 | A * | 7/2000 | Jindal et al. ................... 712/27 |
| 6,118,768 | A * | 9/2000 | Bhatia et al. ................ 370/254 |
| 6,134,588 | A | 10/2000 | Guenthner et al. |
| 6,173,322 | B1 | 1/2001 | Hu |
| 6,185,598 | B1 | 2/2001 | Farber et al. |
| 6,185,619 | B1 | 2/2001 | Joffe et al. |
| 6,205,122 | B1 * | 3/2001 | Sharon et al. ............... 370/254 |
| 6,249,800 | B1 | 6/2001 | Aman et al. |
| 6,304,913 | B1 | 10/2001 | Rune |
| 6,324,580 | B1 | 11/2001 | Jindal et al. |
| 6,338,092 | B1 | 1/2002 | Chao et al. |
| 6,345,294 | B1 | 2/2002 | O'Toole et al. .............. 709/222 |
| 6,347,336 | B1 * | 2/2002 | Song et al. .................. 709/223 |
| 6,389,448 | B1 | 5/2002 | Primak et al. |
| 6,449,647 | B1 | 9/2002 | Colby et al. |
| 6,483,812 | B1 * | 11/2002 | Prorock ....................... 370/252 |
| 6,484,257 | B1 * | 11/2002 | Ellis ............................ 713/153 |
| 6,505,254 | B1 | 1/2003 | Johnson et al. |
| 6,510,154 | B1 * | 1/2003 | Mayes et al. ................ 370/389 |
| 6,510,496 | B1 * | 1/2003 | Tarui et al. .................. 711/147 |
| 6,539,426 | B1 | 3/2003 | Meek et al. |
| 6,553,413 | B1 | 4/2003 | Leighton et al. |
| 6,553,420 | B1 | 4/2003 | Karger et al. |
| 6,563,824 | B1 * | 5/2003 | Bhatia et al. ................ 370/392 |
| 6,571,288 | B1 | 5/2003 | Sarukkai |
| 6,581,065 | B1 | 6/2003 | Rodkin et al. |
| 6,643,269 | B1 * | 11/2003 | Fan et al. .................... 370/254 |
| 6,650,641 | B1 * | 11/2003 | Albert et al. ................ 370/392 |
| 6,717,949 | B1 * | 4/2004 | Boden et al. ................ 370/401 |
| 6,728,670 | B2 * | 4/2004 | Schenkel et al. ............ 704/224 |
| 6,768,743 | B1 * | 7/2004 | Borella et al. ............... 370/401 |
| 6,798,752 | B1 * | 9/2004 | Pope ............................ 370/254 |
| 6,822,943 | B1 * | 11/2004 | Mantin ........................ 370/254 |
| 6,829,239 | B1 * | 12/2004 | Bhatia et al. ................ 370/392 |
| 6,829,641 | B2 * | 12/2004 | Schenkel et al. ............ 709/224 |
| 6,888,837 | B1 * | 5/2005 | Cunningham et al. ...... 370/401 |
| 6,959,333 | B2 | 10/2005 | Beaumont et al. |
| 2001/0039585 | A1 | 11/2001 | Primak et al. |
| 2002/0038360 | A1 | 3/2002 | Andrews et al. |
| 2002/0065938 | A1 | 5/2002 | Jungck et al. |
| 2002/0186694 | A1 | 12/2002 | Mahajan et al. |
| 2003/0041094 | A1 | 2/2003 | Lara et al. |

OTHER PUBLICATIONS

Amir and Shaw, "WALRUS- a Low Latency, High Throughput Web Service Using Internet-wide Replication," In Proceedings of the 19th IEEE Workshop on Electronic Commerce and Web-Based Applications, pp. 31-40, Austin, May 1999, http://www.cnds.jhu.edu/publications/ May 16, 2002.

Bakker, A., et al. "The Globe Distribution Network," *Proc. 2000 USENIX Annual Conf. (FREENIX Track)*, San Diego, pp. 141-152, Jun. 18-23, 2000, http://www.cs.vu.nl/globe/publications.html May 16, 2002.

Carter, R.L. and Crovella, M.E., "Dynamic Server Selection using Bandwidth Probing in Wide-Area Networks," BU-CS-96-007, Mar. 18, 1996, http://citeseer.nj.nec.com/carter96dynamic.html May 16, 2002.

Francis, Paul. "YOID: Extending the Internet Multicast Architecture," [online] http://www.icir.org/yoid/docs/ycHtmlL/htmlRoot.html May 21, 2002.

Guyton, James D.and Schwartz, Michael F.,"Locating Nearby Copies of Replicated Internet Servers" *Computer Communications Review* 25(4): 288-98 (1995).

Karger, D.R. et al., "Consistent hashing and random trees: Distributed caching protocols for relieving hot spots on the world wide web" *Proc. 29th ACM Symposium on Theory of Computing*,654-662, May 1997.

Leach, Paul J., "Selecting a server from among many replicas," Internet Draft, [online] ASID working group, Feb. 23, 1997, http://www.watersprings.org/pub/id/draft-ietf-asid-replica-selection-00.txt May 21, 2002.

Sayal, M., et al. Selection Algorithms for Replicated Web Servers, [online] www.cs.wisc.edu/~cao/WISP98/html-versions/mehmet/SelectWeb1.html May 16, 2002.

* cited by examiner

METHOD AND APPARATUS FOR DETERMINING A NETWORK TOPOLOGY IN THE PRESENCE OF NETWORK ADDRESS TRANSLATION

RELATED APPLICATIONS

This application is a continuation of application Ser. No. 09/766,874, filed Jan. 19, 2001 now abandoned, which claims the benefit of U.S. Provisional Application No. 60/178,062, filed on Jan. 24, 2000, entitled "Method and Apparatus for Determining a Network Topology in the Presence of Network Address Translation", by Johnson et al. The entire teachings of the above application is incorporated herein by reference.

BACKGROUND OF THE INVENTION

Computer networks have provided individuals, corporations, and governments with the means for transferring, sharing, and disseminating large amounts of information and data in digital form. Since the advent of the Internet, data communications has increased in volume and in ways previously unimagined.

An example of data being transferred is real-time video and/or audio. Either media is "packetized," or converted, from an analog or digital form into a series of data packets that are capable of being transferred across various computer networks. Routers, servers, or other data communication devices are used to effect the data transfer. The media is said to emanate from a host server/computer to one or more client servers/computers.

For instance, a White House press conference occurring in Washington, D.C. may be viewed over the Internet by thousands of viewers watching on client computers or other devices. A single local, White House, host server is generally incapable of supporting all the clients at real-time video rates. Also, bottlenecks may occur at local, Washington D.C. routers supporting the packetized video/audio transfer from the host server to all the clients. To facilitate the high speed video data transfer for real-time video viewing, networks of redundant high-speed servers and routers operating around the Internet have had reasonably good success.

Computer network systems often contain routers, firewalls, proxy servers, and other devices that act to disguise or alter the network addresses of various clients and servers. These devices disguising or altering the network addresses do so in order to enhance the security or performance of the network or, in many cases, to make possible the interoperation of computer networks that use addresses that are incompatible for some reason.

A common scenario is a corporate network containing 100 computers using network addresses 10.0.0.1 through 10.0.0.100, using the TCP/IP network protocols. These numbers are used as "private" network addresses, and the public TCP/IP Internet does not route data packets to these private network addresses. In this scenario, the corporation installs one or more routers, firewalls, network address translators (NATs), proxy servers, or other address translation device (ATD) which are configured such that TCP/IP communications between the computers numbered 10.0.0.1 (and so on) and other computers in the Internet take place using one or more publically routable Internet addresses.

Clients in the private network must go through the address translating device(s) between the private network and the Internet to gain access to the real-time video available on the high-speed server network(s). This means that there may be multiple connections desiring real-time video and/or audio feeds through a single Internet access server, router, or other device. As a result of having this "indirect" access to the high-speed router/server network, the client provides the viewer with the real-time video/audio at non-real-time speeds.

To provide real-time access, a server may be placed behind the address translation device in the private network to receive a single stream of data and then distribute that data to other devices in the private network. Devices within the private network that attempt to access the data through a public server may be directed to the local server in the private network. To be able to direct the data communications to appropriate servers, a model of the network hierarchy is maintained. However, the address translation devices interfere with the ability to identify devices within the hierarchy.

SUMMARY OF THE INVENTION

To calculate a model of how routers, firewalls, network-address-translators (NATs), proxy servers, and other address translation devices (ATDs—used in the discussion below to generically indicate any device employing network address translation so as not to specify NATs over proxy servers, etc.) in a network alter the (packet) traffic passing through them, several methods are used to probe the network and infer a model of the network address translation.

To determine a topology of a network induced by network address translation, communications are initiated, from a server behind a translating device, which effect the network address translation. The communications are monitored beyond the translating device to infer partitioning of servers into equivalence sets relative to the network topology induced by the network address translation.

Two types of clients, or devices, may initiate communications: active and passive devices. Active devices include routers, servers, or appliances that may have knowledge of at least one hierarchically superior active device in the hierarchical active device network. Note that an appliance may be equivalence of a server. Passive clients, for example, computers with web browsers, may have no inherent knowledge of the hierarchical server network.

In the communications, an active device may include a respective actual address (i.e., source address) in a message sent to a server outside the subnet, beyond the network address translation device. The actual address may include the sending server's IP address and/or unique identification number, such as the server's ethernet address. The external server beyond the translation device employs a method of distinguishing between communications affected by and not affected by network address translation. To that end, the external server may compare an apparent source address of the received message against the actual address provided in the message by the active device. If those addresses differ, the communication must have passed through an address translation device, and the apparent source address is a translation.

The external server may assess a range of network or subnet addresses behind an address translation device and may assess a range of public network addresses associated with the addresses translating device. In one embodiment, the external server also distinguishes between active and passive client messages. When a passive client communicates to the external server through the address translation device, the external server may respond by sending a redirect command to the passive client, which causes a message to be sent from the passive client to an active client (i.e., server) behind the same address translation device, if there is one. That active client, in turn, communicates with the external server. The communication (the redirect command) from the external server to the passive client may include parameters, thus providing information to the associated active client (server behind the same ATD). The external server may also cause an active client to communicate with another active client behind or beyond the address translation device.

In one embodiment, the external server includes a database which stores translated address sets providing a correspondence between actual client addresses (private addresses) and apparent/translated client addresses (public addresses). A database manager or data structure provides storage, search, and retrieve functions for the stored, translated, address sets. When a communication is received from a client, the external server accesses the translated address sets to compare the apparent message source address with addresses in the translated address sets and to assess whether the source address is behind a known address translation device. Translated address sets may be merged by the external server when it is determined that multiple apparent source addresses in distinct, translated, address sets correspond to the same actual source address.

In one embodiment, if an external server determines that a first apparent address is not already known to be associated with a translated address set but may be associated with a "nearby" translated address set, which is merely a translated address set that includes a second apparent address whose network address is within a predefined metric of the first apparent address, the server applies a timeout mechanism to remove the first apparent address, marked as "speculative," from the "nearby" translated address set. Marking the first apparent address "speculative" is done because it is sometimes advantageous to retain previously unknown apparent addresses rather than to immediately discard the first apparent address. For example, another communication may enable the external server to change the speculative setting to "non-speculative". If, however, the first apparent address is determined to belong to a different translated address set or no translated address set at all, the first apparent address may be included in a so-called "excluded" list within translated address sets with which the first apparent address is not associated. Use of the excluded list reduces the likelihood that a client beyond a translating device is constantly redirected to a server behind a translating device, but as a result is never serviced.

To account for a dynamically changing network, the principles of the present invention teach a "soft state" mechanism. The soft state mechanism deletes known translated addresses from the server database of translated address sets after a predefined period of time. Occasionally deleting translated addresses, then recreating them using the techniques described above, refreshes information about the partitioning of servers induced by any ATDs in the network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
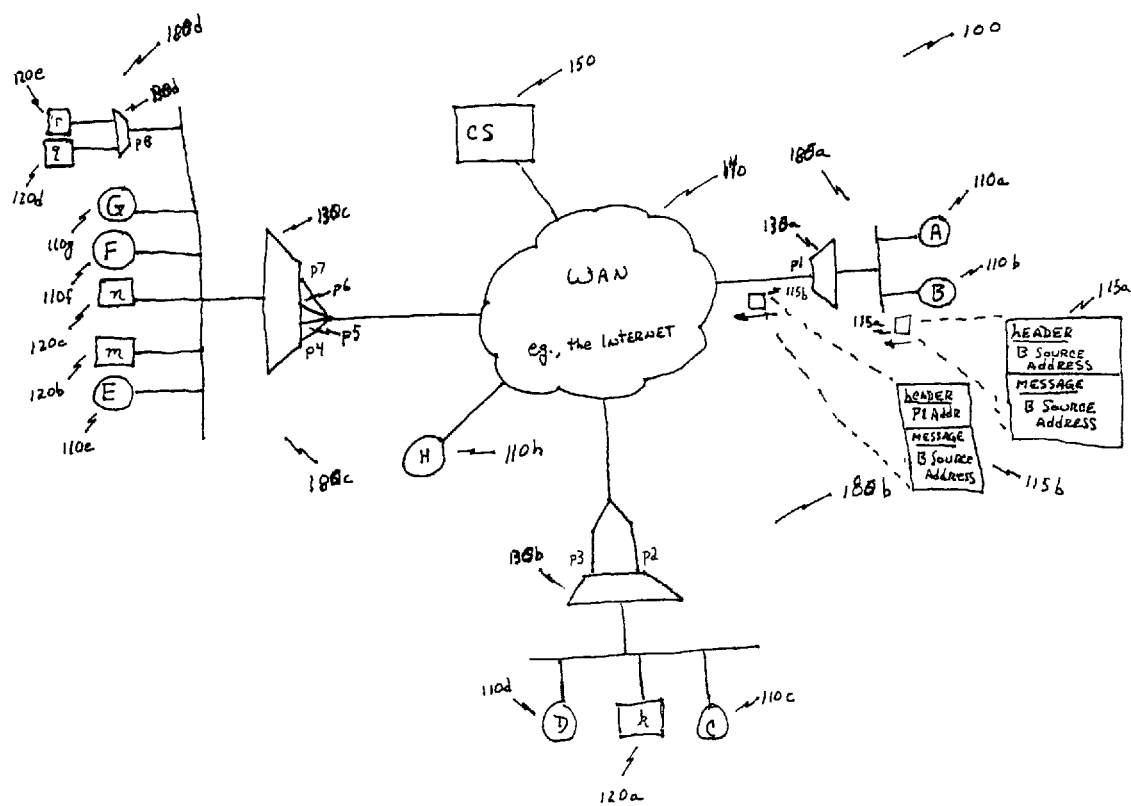
FIG. 1 is a block diagram of an example network in which the present invention is deployed.

FIG. 1 is a block diagram of a network 100 that includes examples of various network topologies. Included in the network 100 are ATDs (address translation devices) 130a, 130b, 130c, 130d (collectively 130), active clients, which are typically servers A, B, C, ... H, respectively 110a, 110b, 110c, ..., 110h (collectively 110), and passive clients l,m,n,q,r, respectively 120a, 120b, 120c, 120d, 120e (collectively 120). The passive devices are sometimes referred to as end-users 120. The network 100 further includes a WAN (Wide Area Network) 140, e.g., the Internet, and CS (Central Server) 150.

The network 100 includes several subnets 180a, 180b, 180c, and 180d (collectively 180). The servers 110 have so-called "zones of coverage," where clients within a first server coverage zone get information from a first server, clients within a second server coverage zone get information from a second server, and so on. The servers 110 are usually configured in a hierarchical arrangement, as discussed in detail in U.S. patent application Ser. No. 09/294,837, incorporated herein by reference in its entirety.

The network 100 may include wire and wireless links, interfaces, and devices. The servers 110 may be routers, computers, computer boards, computer chips, software, hand-held wireless devices or other electronic devices capable of operating the processor routines described herein. The end-users 120 may be computers with browsers, personal communication devices, cell-phones, etc. The ATDs 130 may be network address translation devices, proxies, and firewalls, TCP translators, or other address translation devices.

Proxies operate on the application layer of the standard, seven-layer, ISO, communication protocol stack. An application operating inside the subnet 180 having a proxy server does not have a pretense that it is talking to an outside server. In other words, an application contacts a proxy server to do work on the application's behalf. Since a proxy server typically has a single public address (e.g., devices 130a, 130d), a subnet may employ more than one proxy server to perform load balancing and provide multiple public (outbound) addresses.

ATDs operate on the network layer of the standard, seven-layer, ISO, communication protocol stack. An application operating on the subnet 180 behind an ATD thinks it is talking directly to an outside server. ATDs can have more than one public address (e.g., devices 130b, 130c), which allows an ATD to use the public (i.e., external, proxy, apparent, perceived, etc.) addresses in a random or pseudorandom manner. In many cases, however, ATDs do not actually randomly use the public addresses; instead, multiple outbound addresses are employed/required to ensure sufficient capacity for the number of network communications that are passing through the ATD.

The devices 110, 120 behind the ATDs 130 communicate with devices 110*h*, 150 beyond the ATDs 130 through typical network communication packets. Two such packets are represented by packets 115*a* and 115*b* (collectively 115). The packets 115 have a header area, which includes network communication protocol information, and message area, which includes substantive device messages.

Packets 115 illustrate the effect of network address translation by the ATDs 130 on the packets 115. Behind the ATD 130*a*, packet 115*a* header has server B 110*b* source address information. Beyond the ATD 130*a*, packet 115*b* header has public address P1 information. Note, however, that the message areas of both packets 115*a* and 115*b* have the same server B 110*b* source address information, unfettered by the network address translation of ATD 130*a*. The servers 110 include their source address information in the message areas for network topology inferencing discussed below.

In the network 100, the CS 150 (or other server 110 used for data distribution purposes) seeks to learn the network addresses of each of the (other) servers 110 in an autonomous manner, or at least network topography relative to ATDs, through the use of a processor routine described in reference to FIGS. 2-8. However, because of the presence of the ATDs 130, the CS 150 may be required to infer the network topology. To infer the topology, the CS 150 collects, organizes, and processes network transport level (from IPO guidelines) information from messages, sometimes referred to as data communication packets, received from both the active and passive network devices, 110, 120 respectively. The CS 150 creates a list or database, which may be dynamic. The list or database may include public addresses used by the ATDs 130 and addresses of active and passive devices positioned behind respective ATDs 130. The associated ATDs 130 and active and/or passive device addresses are stored together and referred to as a translated address set, discussed further in reference to FIG. 2.

The present invention is used by servers 110, and possibly other network devices, to determine the network servers of a subset of related network devices. Servers 110 that have information of related network devices may reduce data latency between end-users 120 and the servers 110 in an effort to reduce and/or balance network loading. (See patent application Ser. Nos. 08/779,770, 08/294,837, 09/294,836, and 60/160,535, incorporated herein by reference). By knowing the network addresses of the servers 110, the CS 150, for example, can redirect an end-user 120 browser to an appropriate server 110 behind the end-user's respective ATD. Because the applications for the servers 110 typically include disseminating real-time video and/or voice data, several end-users (e.g., m 120*b*, n 120*c*) attempting to access data simultaneously from the CS 150, or other hierarchically intermediate server such as server H110*h*, cause congestion, thus limiting the effective data flow seen by any one object. However, by redirecting the end-users to appropriate, respective servers, for example servers E 110*e*, F 110*f*, or G 110*g*, the CS 150 or other server (e.g., H 110*h*) may issue a single feed of video and/or voice data to the subnet 180*c* server for distribution by the server rather than two, three, or more feeds to individual end-users-all through the same ATD. This redirection scheme allows the server network to balance the end-user load. Further, since subnet bandwidth is relatively fast, compared to communication with the Internet 140 via the ATDs 130 or other gateway device, the end-users 120 receive the real-time video and/or voice data at a much higher bandwidth than were each end-user 120 to independently spool the real-time data from the CS 150 or server H 110*h*.

The process of inferring network topology occurs on a continual basis each time a client-server 110 or client-end-user 120 requests data from an server not within the client's so-called "coverage zone". (See application Ser. No. 09/294,837 incorporated herein by reference).

Because computer networks are constantly changing, the present invention optionally provides dynamic monitoring of the clients 110, 120. Network changes may include adding, removing, shutting-off, relocating, crashing, network conflicts—and other such actions that make a network dynamic—which any of the network devices may experience at the hands of network administrators, users, power outages, software viruses, to name a few. To account for a dynamically changing network 100, the processor routines, operating on the CS 150 and/or other servers 110 provide a timeout mechanism, which may be applied to individual translated addresses. Once a timeout is reached, typically ranging from several minutes to several hours, the timed-out translated address is removed from storage. The removed translated address relationship is re-established through the processes discussed in relation to FIGS. 2-8. Of course, the translated addresses may also be cleared in the event that the CS 150 or other server 110 detects a translated address is no longer valid. In one embodiment, each of many servers in the network 100, including subnets 180, performs network topology inferencing, making the server-network autonomous and dynamic, automatically accounting for the dynamic changes in the network topology. For purposes of the discussions related to FIGS. 2-8, all references to hardware refer to FIG. 1, unless otherwise specified.

Figure 2:
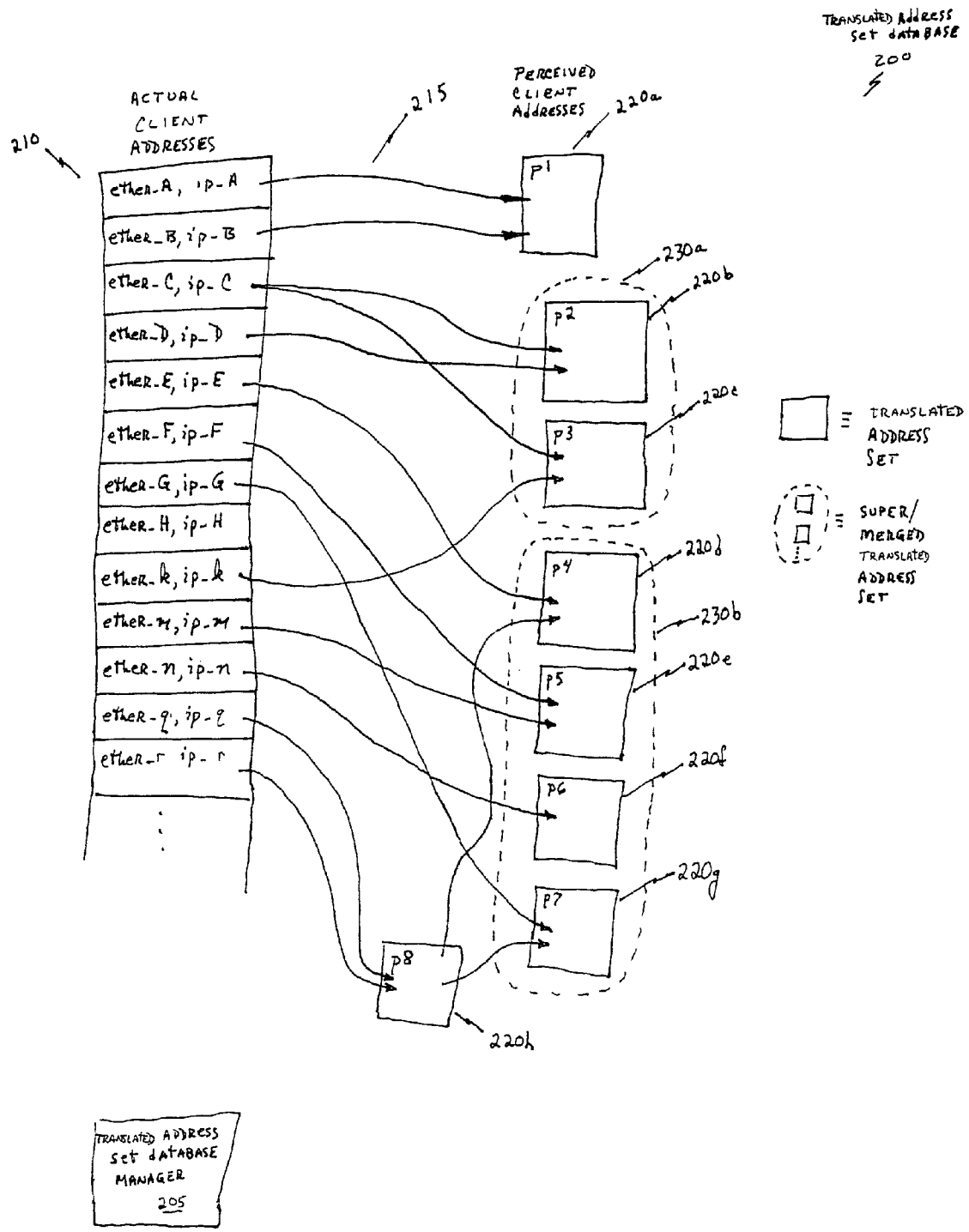
FIG. 2 is an illustration of a mapping between actual and apparent addresses for the network devices of FIG. 1.

FIG. 2 is a block diagram representing associations between apparent addresses and client addresses. The apparent addresses of clients 110, 120 seen by devices external from the subnets 180 are due to network address translation by the ATDs 130. The server 110, 150 employing the present invention maps 215 a client address list 210 to translated address sets 220*a*, 220*b*, . . . , 220*h* (collectively 220). Translated address set P1 220*a* includes server A 110*a* and server B 110*b*. In one embodiment, both the Ethernet addresses and IP addresses are included in the client address list 210, and optionally in the translated address sets 220. Translated address set P2 220*b* includes the addresses of server C 110*c* and server D 110*d*. Translated address set P3 220*c* includes the addresses of server C 110*c* and end-user k 120*a*. In one embodiment, the list of client addresses 210, mappings 215, and translated address sets 220 are stored in a translated address set database 200. A translated address set database manager 205 provides storage, search, and retrieve functions for the database.

The server H 110*h* or CS 150 storing and monitoring the translated address sets 220 seeks to identify various public addresses determined to be used by the same ATD 130. In this case, ATD 130*a* has only a single public address P1, whereas ATD 130*b* has two public addresses P2 and P3. Because the address of server C 110*c* is determined to be in both translated address sets 220*b* and 220*c*, the translated address sets P2, P3, 220*b*, 220*c*, respectively, are merged into a single translated address set 230*a* through techniques discussed later.

Further relationships and groupings of translated address sets can be determined empirically. Of special note, however, is translated address set P8, which is a member of translated address sets P4, P7, and possibly over time, P5 and P6 (recall the random public addressing schemes of ATDs discussed above). Translated address set P8 is included in translated address sets P4-P7 because, as can be seen in FIG. 1, subnet 180c includes an embedded subnet 180d. An example of such an arrangement is a corporate network (subnet 180c) that includes a proxy server 130d, behind which financial officers have their computers (q and r) storing financial records. As in the case of translated address sets P2 220b and P3 220c, the server storing the translated address sets 220 merges translated address sets P4 220d through P7 220g into a so-called "super" translated address set 230b.

In one embodiment, the client address list 210 includes all client addresses. In an alternate embodiment, the client address list 210 includes only server 110 addresses, and end-user 120 addresses are stored in a separate list (not shown and optionally stored in separate translated address sets 220).

Figure 3:
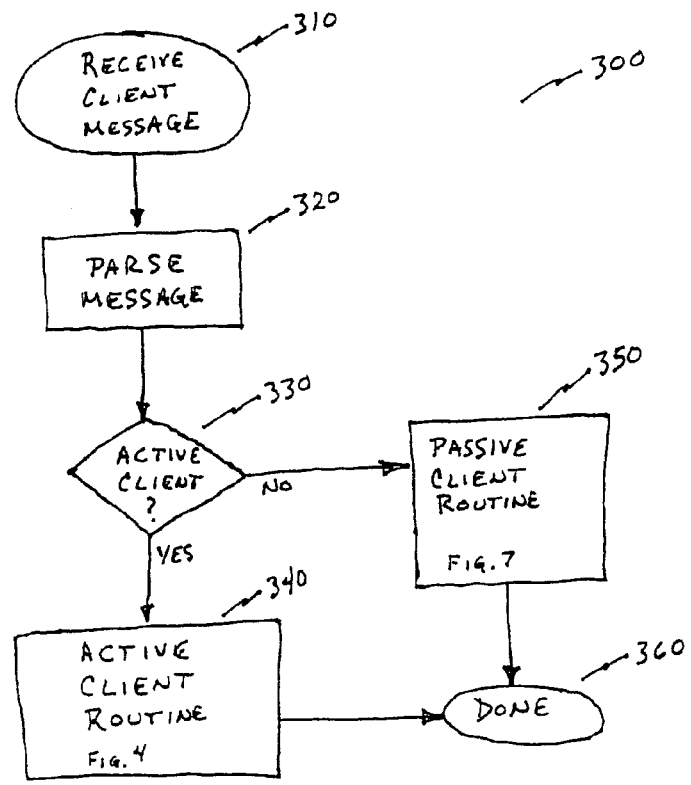
FIG. 3 is a flow diagram of a general process of the present invention deployed in FIG. 1.

FIG. 3 is a high-level flow diagram of an embodiment of a main processor routine 300 operating on a server 110, 150 performing network address translation inferencing. Receiving a client message in step 310 initiates the process in the server 110, 150. The server parses messages in step 320 and, in step 330, determines whether the received message is from an active or passive client. Active clients put their actual addresses in the message (according to a predefined protocol designable by a programmer knowledgeable in network communication protocols) where the ATD 130 is unable to affect the actual address; passive clients are unable to put their actual addresses in the message. If the message is determined to be from an active client, then active client routines 340 are performed. If the message is determined to be from a passive client, such as a web browser, then passive client routines 350 are performed. The main processor routine 300 is finished in step 360.

Figure 4:
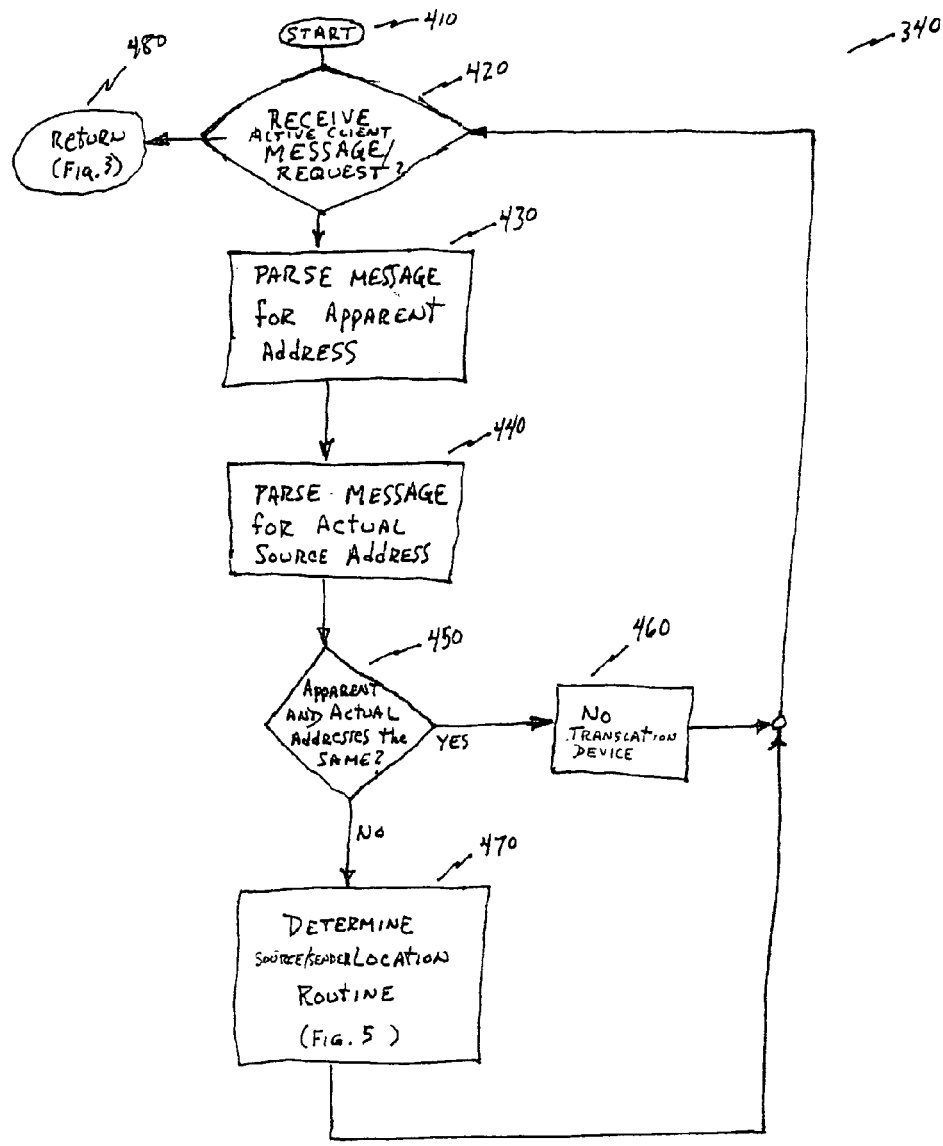
FIG. 4 is a flow diagram of a high-level active client routine of FIG. 3.

FIG. 4 is a flow diagram of an embodiment of the active client routine 340. The active client routine 340 begins in step 410, which performs parameter passing and local variable initialization. In step 420, the active client routine 340 receives the active client 110 message/request. In step 430, the routine 340 parses the message for an apparent address. The apparent address is the address assigned to the message by an ATD 130. In step 440, the routine 340 parses the message for an actual source address. The active clients 110 provide a respective unique ID and/or source ID (i.e., ether address and network address) in the data portion of the message, which is unaffected by the network address translation being performed by the ATDs 130.

Figure 5:
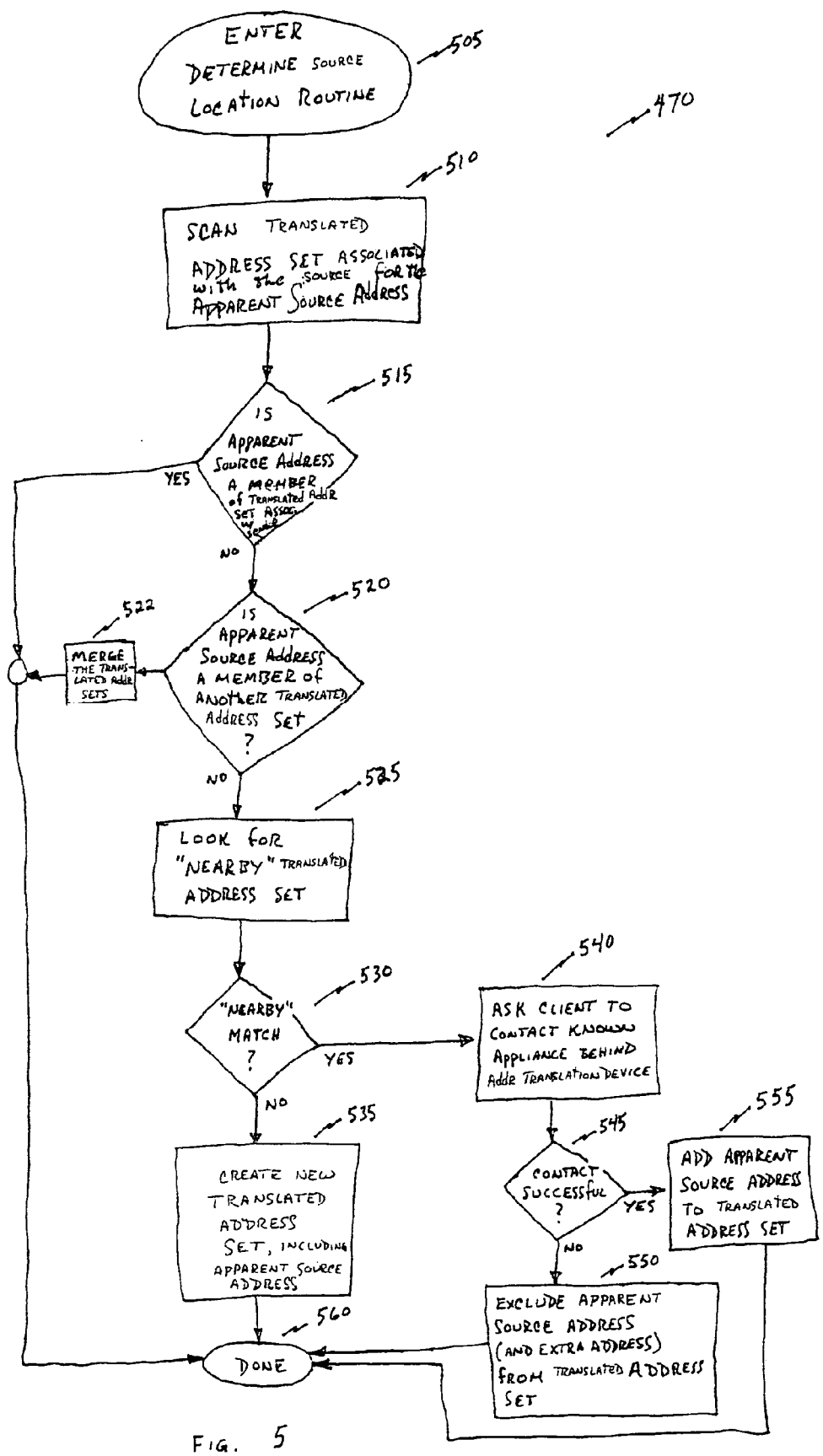
FIG. 5 is a flow diagram of a determine sender location routine of FIG. 4.

In step 450, the routine 340 performs a comparison between the apparent and actual addresses that were determined in steps 430, 440, respectively. If the apparent and actual addresses are the same, then no network address translation is being performed between the message sender and message receiver, which is stated in step 460. If the apparent and actual addresses are not the same, then processing continues in a "determine sender location" routine 340 (FIG. 5). The process of the active clients routine continues until all messages from active clients have been processed. Control is returned back to the main processor routine 300 in step 480.

FIG. 5 is a flow diagram of the "determine sender location" routine 470. This routine 470 uses information stored in the translated address sets 220 (FIG. 2) to determine if the active client 10 that issued the message being processed has been identified to be behind an ATD 130.

The determine sender location routine 470 begins in step 505, where parameters are passed and local variables are initialized. In step 510, the routine 470 scans the translated address sets for the apparent source address. To get a better understanding of the translated address sets 220 (FIG. 2), a generalized translated address set 220 schematic 600 is presented in FIG. 6.

Figure 6:
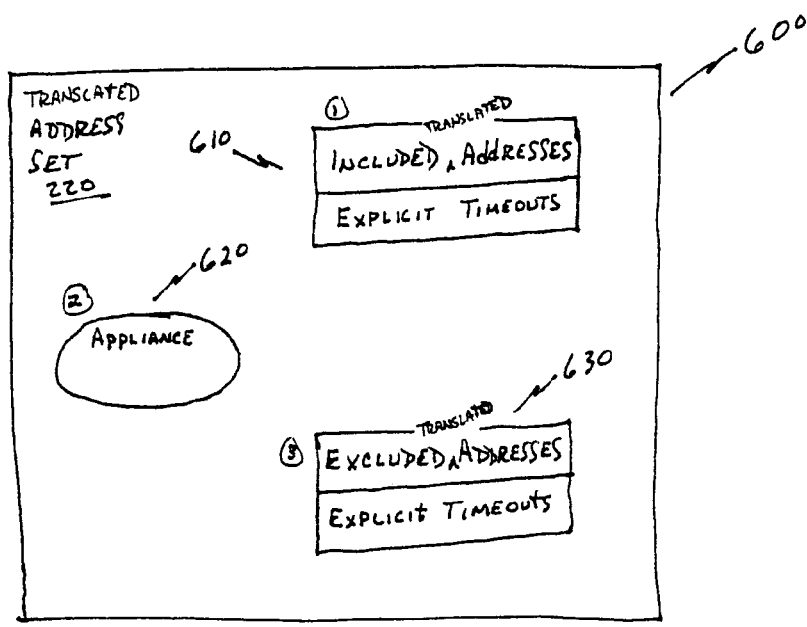
FIG. 6 is a structural diagram of a translated address set of FIG. 2.

FIG. 6 provides a schematic 600 of a generalized translated address set 220. The translated address set 220 can be thought of as a record having fields of information. A first field 610 stores included addresses, and, optionally, explicit timeouts for these included addresses. The included addresses include the public addresses (i.e. P1, P2, etc.). The explicit timeouts include times, associated with respective addresses, after which the respective apparent addresses are discarded. This concept is discussed in detail in reference to FIG. 8.

The translated address set 220 further includes a field 620, which stores server 110 actual addresses. As illustrated in FIG. 2, the server actual addresses in field 620 are related to the included apparent addresses of field 610. Lastly, the translated address set 220 optionally includes a third field 630 that is used to store excluded public addresses determined to have no association with an ATD. Optionally, the third field 630 may include explicit timeouts paired or associated with respective excluded addresses.

Referring again to FIG. 5, in step 515, the determine_sender_location routine 470 makes a determination as to whether the apparent source address is a member of the translated address set 220 associated with the sender address. If the apparent source address is a member of the same translated address set, then the routine 470 is done in step 560, returning control back to the active client routine 340 (FIG. 4). If the apparent source address is not a member of the first translated address set, then search continues in step 520. Note that a new, empty translated address set is created if the sending address has not been seen before.

The determine sender location routine makes a determination as to whether the apparent source address is a member of another translated address set in step 520. Where step 515 tests a simple case, subnet 180a, step 520 tests a more difficult case, subnet 180b or 180c. If the apparent source address is a member of another translated address set 220, then the two translated address sets are merged in step 522. Step 522 also includes updating the mapping 215 (FIG. 2) of server 110 actual addresses to translated address sets to reflect the merger of translated address sets. After step 522, step 560 returns control back to the determine active client routine 340 (FIG. 4).

If the apparent source address is not a member of another translated address set, then the external server 150, 110h has not received a communication from the sender. In step 525, the process is not checking for a match, but looking for a "nearby" translated address set. If step 530 does not determine a so-called "nearby" match, then, in step 535, a new, translated, address set is created. The new, translated, address set includes the apparent source address. The new, translated, address set, is associated with the actual source address in the translated address set database 200 (FIG. 2). After step 530, the determine_sender_location routine 460 exits in step 560, returning control to the active client routine 340 (FIG. 4).

If step 530 does not determine a so-called "nearby" match, then, in step 535, a new, translated, address set is created. The new, translated, addressed includes the apparent source address. The new, translated, address set is associated with the actual source address in the translated address set database 200 (FIG. 2). After step 530, the determine_sender_location routine 470 exits in step 560, returning control to the active client routine 340 (FIG. 4). If step 530 determines a "nearby" match, then the routine 470 takes a proactive step in step 540 to determine whether the sender is actually behind the "nearby" ATD 130.

"Nearness" may be determined or defined in many different ways. For example, using the IP addressing scheme:
  (a) x.y.z.251
  (b) x.y.z.254
  (c) x.y.(z+1).2 where depending on the nearness scheme being used, addresses (a) and (b) may be considered near and/or addresses (a), (b), and (c) may also be considered near. Nearness schemes may require the first bits, for example the first twenty-four, of the thirty-two bit IP address to be the same. Another "nearness" scheme may include having a database of company networks that provide nearness metrics. Such metrics may be related to network distance, company geography, or other standard metric. The nearness may also be established heuristically over time.

In step 540, the external server 110h, 150, via the determine sender routine 470, asks the server 110, or active client 120 in some cases, that sent the message to contact a known server 110 behind a respective ATD 130 (e.g., "client 110c contact server D 110d"). In step 545, the routine 470 determines whether the contact was successful. If the contact was not successful, then the apparent address (and any extra addresses found from the message communication) is excluded from the translated address set in step 550. The excluded addresses are stored in the excluded translated address list 630 (FIG. 6). The process continues to step 560, as discussed above. If the contact was successful, then the apparent source address is added to the included translated address list 610 (FIG. 6) in the translated address set 220 in step 555. The determine sender location routine 470 ends in step 560.

Referring again to FIG. 3, a description of an embodiment of a routine that services active client messages has been described in FIGS. 4-6. Recalling that active clients, such as the servers 110, insert into the message their source addresses, a server, external from a subnet on which a sending server is located, is able to learn of the correlation between the apparent source address and the actual source address of the server by comparing the two addresses. However, in the case of a passive client, such as a computer 120 having a web browser, the passive client does not tell the external server of its source address in the message sent to the external server. Therefore, another technique must be used to service client messages, which is the subject of the passive client routine 350 (FIG. 7).

Figure 7:
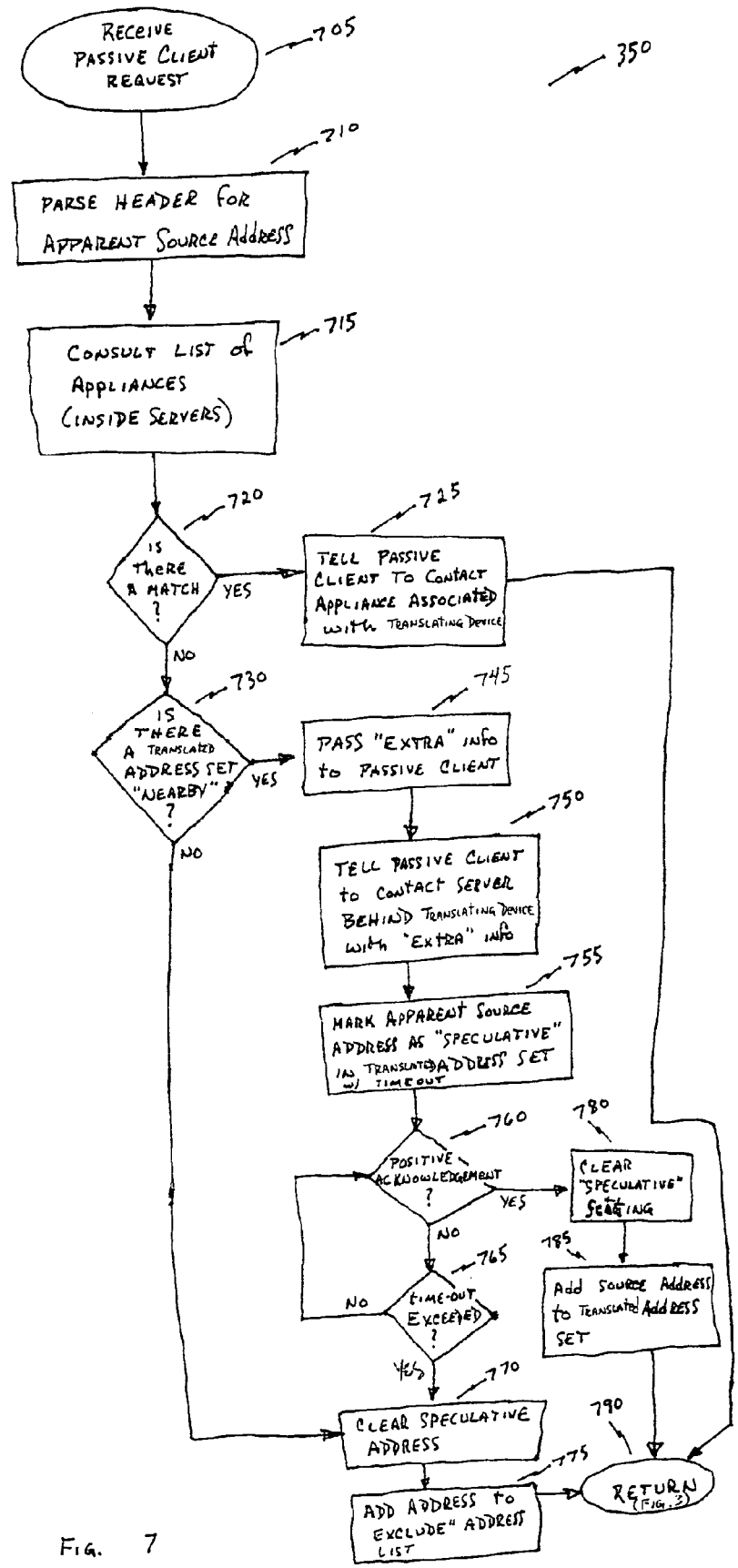
FIG. 7 is a flow diagram of an embodiment of a passive client routine of FIG. 3.

FIG. 7 is an embodiment of the passive client routine 350 operating on an external server 110h, 150. The passive client routine 350 receives a passive client request in step 705. The routine 350 parses the header for an apparent source address in step 710. In step 715, a list of servers 110 is consulted by the external server to determine whether the passive client 120 has already been associated with one of the subnet servers 110a-g. In one embodiment, the external server 110h or CS 150 may have passive client/server relationship information incorporated into its translated address set database 200, as depicted in FIG. 2. In an alternate embodiment, the external server contacts the subnet servers 110a-g of which the external server has knowledge in order to find out whether any of the subnet servers has local communication with the contacting passive device 120. If there is a match through either of these methods, then in step 725, the external server 110h or 150 tells the passive client 120 to contact the respective subnet server (in the passive client's zone). In this case, the passive client routine 350 is complete.

If step 720 finds no match, then in step 730, the translated address sets 220 (FIG. 6) are consulted to determine if there is a "nearby" translated address set 220. If step 730 determines there is not a translated address set 220 nearby, then, in step 745, the process continues to step 790, where the passive_client routine 350 returns control back to the main processor routine 300. Because no server behind the ATD is identified, the external server either provides the requested service from the passive client or, optionally redirects the passive client to a different external server for service, for reasons including efficiency, coverage area, or server congestion.

If there is a translated address set 220 nearby, then, in step 745, the external server passes "extra" information to the passive client 120 and causes (i.e., redirects) the passive client to contact an active client behind the ATD 130 associated with the nearby translated address set 220. Such "extra" information, for example, in HTTP, includes, at least one extra "CGI" argument (CGI arguments are syntactic parameters), extra "path" information, and/or other URL (uniform resource locator) syntax. The passive client 120 (i.e., so-called "dumb" browser) forwards the received extra information from the so-called "dumb" browser to the more "intelligent" server 110, which, in turn, contacts the server with notice that the internal subnet server did, in fact, receive a message from the passive client, thereby establishing a relationship between the passive client and the subnet server behind the same ATD.

Accordingly, after the extra information is passed to the passive client in step 745, in step 750, the external server tells the passive client to contact the server behind the possible "nearby" ATD 120 with this extra information. Responsively, in the external server translated address set 220, the external server marks the apparent source address as "speculative" in the "nearby" translated address set in step 755, along with a respective timeout. There are at least two options of what to do with the apparent source address upon executing a "speculative redirection" of this sort: (i) immediately exclude the address (possible to have it later removed from the excluded address set and added to the included address set if the speculative redirect is successful), or (ii) speculatively add the address to the included address set with a short timeout. Speculatively adding the address (instead of immediately excluding it) gives rise to a behavioral feature where subsequent clients making requests through the same apparent IP address, after the speculative redirect but before a positive acknowledgment has been received, continue to be re/directed to the server behind the ATD. If one is optimistic and assumes networks are typically set-up such that speculatively adding the address set is the right thing to do, this is an advantage. Of course, if one is pessimistic, it is a disadvantage. In any case, immediately excluding the apparent source address is just a restricted case of a more general scheme in which addresses are added speculatively with a timeout (specifically, immediate exclusion is the degenerate case where the timeout is zero).

In step 760, the external server makes a determination as to whether a positive acknowledgment was received from the subnet server to which the passive client was redirected. If a positive acknowledgment was not received from the respective subnet server, then a timeout exceeded query 765 is performed by the passive client routine 350, which allows additional time for an subnet server to issue an acknowledgment to the external server. If the timeout has not been exceeded, then in step 760, the routine 350 checks again whether a positive acknowledgment has been received. If the timeout has been exceeded, then the routine 350 clears the speculative address in step 770. Following the step of clearing the speculative address in step 770, the apparent address is added to the "excluded" address list 630 (FIG. 6) in the translated address set 220, as depicted and described in FIG. 6. The excluded address list 630 provides the processor routine with a quick way to determine that the apparent address does not belong to the translated address set 220. Also, without the excluded address list 630, there may be a condition that every time a passive client tries to get service, it would be redirected to an active client (server) that it was not capable of communicating with due to the presence of an ATD, not get service, then continue to be redirected to the same active client; the exclude address list 630 breaks the endless cycle in this instance. Control returns back to the main processor routine 300 in step 790.

If, in step 760, the passive client routine 350 determines that a positive acknowledgment has been issued by subnet server associated with the passive client, then "speculative" setting marked with the apparent source address (in step 755) is cleared in step 780. The passive client source address is then added to the translated address set in step 785. Control is returned to the main processor routine 300 in step 790.

Figure 8:
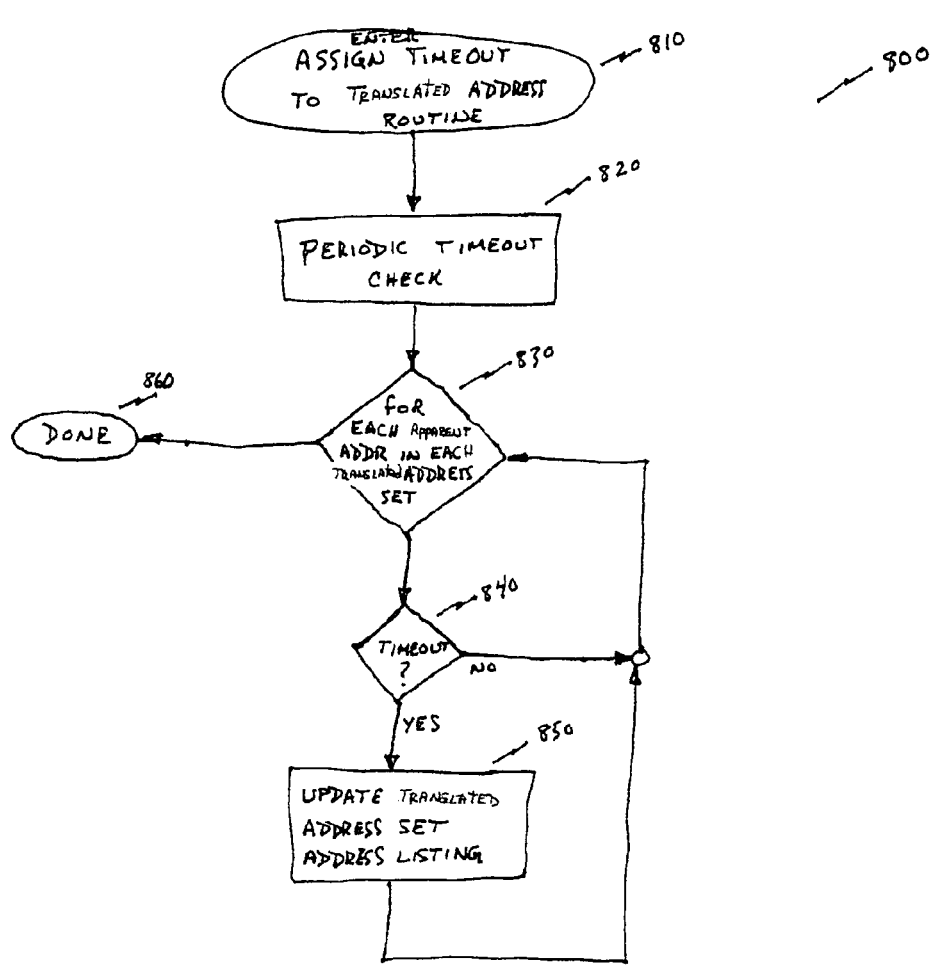
FIG. 8 is a flow diagram of a timeout routine applied to the translated address sets of FIG. 6.

FIG. 8 is an embodiment of an assign timeout to apparent address routine 800. This timeout routine 800 is used to assign and test timeouts to data and translated address sets 220 (FIG. 6). This timeout routine 800 may be event or interrupt driven, depending upon the implementation of the processor routine within the servers 110 and central server 150.

The timeout routine 800 begins in step 810, where parameters are passed and local variables are initialized. Step 820 provides a periodic start point at which interrupt driven embodiments begin. In the embodiments shown, a loop, beginning in step 830 is used to scan through each apparent address in order to determine whether that apparent address is still valid or has reached a timeout, whereafter the apparent address should be removed from its respective included and/or excluded translated address list, 610, 630, respectively (FIG. 6).

In the loop, step 840 determines whether the apparent address has reached a timeout. If the apparent address has not reached a timeout, then the next apparent address is tested, starting again at step 830. If a timeout for the apparent address being tested has been reached, then the respective translated address set 220 (FIG. 6) is updated. When each of the addresses in each of the translated address sets has been tested for a timeout condition, the time-out routine 800 is complete in step 860. The use of the timeout routine 800 is for information and factual timeouts, where factual timeouts refers to network dynamics reasons, as discussed above. In an alternate embodiment, each translated address set 220 is simply purged from the translated address set database 200 (FIG. 2) rather than on an individual apparent address basis, as described above. Each purged translated address set 220 is re-learned through the processes described above.

Timing out translated address sets by the external server is referred to as a so-called "soft state." In this case, the mapping 215 (FIG. 2) from the servers 110 address list 210 (FIG. 2) to the translated address sets 220 (FIG. 2) is timed-out and brought back on line. This timeout occurs, for example, at a start time plus three hours, start time plus three minutes, or other such reasonable time. The other case in which the timeout is used is for the translated address sets included and excluded lists 610, 630, respectively. The timeouts are determined through an empirical balance, which may be dynamic, adaptive, heuristic, or configurable.

Using the timeout routine 800, the servers 110 and, more generally the server network, becomes a more tolerant and robust system, accounting for such network changes as adding or removing devices, ATDs, servers, additional subnets, and experiencing power outages. Each such event changes the loading on one or more of the established servers 110, which, through the use of these timeouts, may be brought back on line with a modified coverage area, for example, in the case of additional servers in the hierarchical server network.

It should be understood that the method of the present invention can be implemented by a processor in a server that executes computer instructions, which are stored on a computer readable medium device, such as a ROM, CD ROM, hard disk, or other form of computer storage device.

This application is related to application Ser. No. 08/779,770 filed Jan. 7, 1997 entitled "Replica Routing;" application Ser. No. 09/294,836 filed Apr. 19, 1999 entitled "Self-Organizing Distributed Appliances;" application Ser. No. 09/294,837 filed Apr. 19, 1999 entitled "Replica Routing;" and Provisional Application No. 60/160,535 filed Oct. 20, 1999 entitled "Automatic Network Address Assignment and Translation Inference;" Provisional Application filed Jan. 21, 2000 entitled "Method and Apparatus for a Minimalist Approach to Implementing Server Selection;" and Provisional Application filed on this same day entitled "Method and Apparatus for Automatic Network Address Assignment." The contents of the above applications are herein incorporated by reference in their entirety.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of determining a network topology induced by network address translation, comprising:
   initiating communications, from a server behind a translating device, which effect the network address translation;
   monitoring the communications beyond the translating device to infer partitioning of servers behind the translating device into equivalence sets relative to the network topology induced by the network address translation, maintaining at least one translated address set, and comparing apparent message source addresses with addresses in the at least one translated address set; and
   merging translated address sets in response to determining that multiple apparent source addresses in distinct translated address sets correspond to the same actual source address.

2. The method according to claim 1 wherein the communications include at least one source address in a message.

3. The method according to claim 2 wherein the source address includes an IP address.

4. The method according to claim 2 wherein a unique identification number is included in the message.

5. The method according to claim 1 wherein monitoring includes distinguishing between communications affected by and not affected by network address translation.

6. The method according to claim 5 wherein distinguishing includes comparing an apparent source address of a message against an actual source address provided in the message.

7. The method according to claim 1 further comprising assessing a range of network addresses behind the translating device.

8. The method according to claim 1 further comprising assessing a range of public network addresses associated with the translating device.

9. The method according to claim 1 further comprising distinguishing between active and passive clients.

10. The method according to claim 9 further including directing a message from a passive client to an active client.

11. The method according to claim 9 further including, from a processor beyond the translating device, causing a message to a passive client to be redirected to an active client, the active client responsively communicating with the processor beyond the translating device.

12. The method according to claim 1 further including assessing whether the source address is behind a known address translation device.

13. The method according to claim 1 further comprising providing a timeout mechanism for removing an address from a translated address set.

14. Apparatus to be located beyond a network address translation device for determining a topology of a network in the presence of network address translation, comprising:
- a processor coupled to a network interface for receiving communication from a network device effecting network address translation and further coupled to memory;
- a processor routine operating on the processor, the processor routine to infer partitioning of servers behind a network address translation device into equivalence sets relative to the network topology induced by the network address translation and to store a database of translated address sets in the memory; and
- a database manager to compare apparent message source addresses with addresses stored in the database of translated address sets, and to provide a timeout mechanism for removing translated addresses from the translated address sets in the database.

15. The apparatus according to claim 14 wherein the messages received include at least one source address in the message.

16. The apparatus according to claim 15 wherein the processor routine compares an apparent source address of a message against an actual source address provided in the message.

17. The apparatus according to claim 15 further including at least one translated address set, the source address being stored in the translated address set.

18. Apparatus to be located behind a network address translation device for providing communications used to determine a topology of a network in the presence of network address translation, comprising:
- a processor behind a network address translation device coupled to a network interface and to memory, the processor initiating communications to a server beyond the network address translation device to effect network address translation;
- a processor routine operating on said processor, said processor routine providing the actual network address of the processor in a message of the communications unaffected by the network address translation; and
- a processor routine storing a database of translated address sets in the memory.

19. The apparatus according to claim 18 wherein said processor issues communications in response to receiving a communication from behind the network address translation device.

20. In a network device beyond a network address translation device, a method for determining a topology of a network in the presence of network address translation, the method comprising:
- receiving communication messages from a network device effecting network address translation;
- inferring partitioning of servers behind a network address translation device into equivalence sets relative to the network topology induced by the network address translation;
- storing a database of translated address sets;
- comparing apparent message source addresses with addresses stored in the database of translated address sets; and
- removing translated addresses from the translated address sets in the database after exceeding a timeout duration.

21. In a network device located behind a network address translation device, a method for providing communications used to determine a topology of a network in the presence of network address translation, the method comprising:
- initiating communications to a server beyond a network address translation device to effect network address translation;
- providing the actual network address of a processor, behind the network address translation device, in a message of the communications unaffected by the network address translation; and
- storing a database of translated address sets in the memory.

22. The method according to claim 21 further including issuing communications in response to receiving a communication from behind the network address translation device.

* * * * *